(No Model.) 2 Sheets—Sheet 1.

R. & M. R. ADAMS.
CULTIVATOR.

No. 363,571. Patented May 24, 1887.

WITNESSES  
Cyrus Kehr.  
Geo. K. Packer

INVENTORS  
Robert Adams  
Matthew R. Adams.  
By Manahan & Ward  
Their Atty (No Model.)  2 Sheets—Sheet 2.
R. & M. R. ADAMS.
CULTIVATOR.
No. 363,571. Patented May 24, 1887.
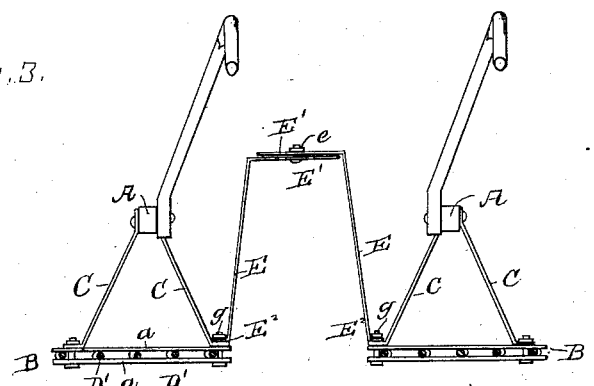
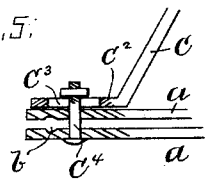
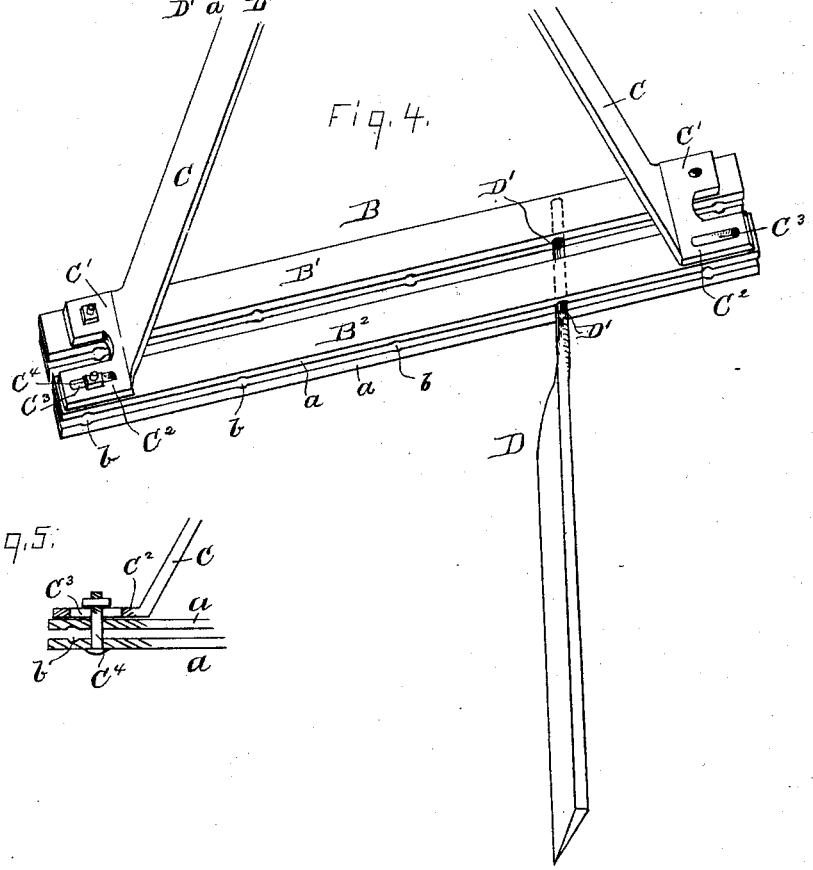

UNITED STATES PATENT OFFICE.

ROBERT ADAMS AND MATTHEW R. ADAMS, OF STERLING, ILLINOIS.

CULTIVATOR.

SPECIFICATION forming part of Letters Patent No. 363,571, dated May 24, 1887.

Application filed August 28, 1886. Serial No. 212,072. (No model.)

*To all whom it may concern:*

Be it known that we, ROBERT ADAMS and MATTHEW R. ADAMS, citizens of the United States, residing at Sterling, in the county of Whiteside and State of Illinois, have invented certain new and useful Improvements in Cultivators; and we do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Our invention has reference to corn-cultivators of the class generally termed "pulverizers," and intended for surface cultivation; and it consists more especially in mechanism for varying the width of the machine, mechanism for regulating the different angles of the pulverizing-knives, and in gradually decreasing the length of each series of knives from the outward to the inward knife of each series.

Our invention is intended to be drawn by two horses and to straddle the row of corn.

Our machine is adapted to be attached to the axle of the carrying-wheels of any straddle-row cultivator and to have its forward end suitably adjusted on such axle.

In machines of this class it is desirable to have the knife-head drawn perpendicular to the row, so that clods and rubbish will pass under such head and not be deflected to the growing corn at the side of such head; also, the earth is more likely to pass over the knife instead of along its front side. It is also essential in some grounds, in order to cut the weeds, to have the cutting-edge of the knives to stand as much as possible across the space between the rows; but with knives of the same length, unless they are all too short for effective work, the rear of the knives cannot be thrown inward sufficient without either making the machine too wide or bringing the rear ends of the inside knives too close to the straddled row of corn, while by making the knives of decreasing lengths inwardly the outer knives can be of proper length, the inner of safe distance from the straddled row, and all of them given the requisite lateral angle.

Figure 1:
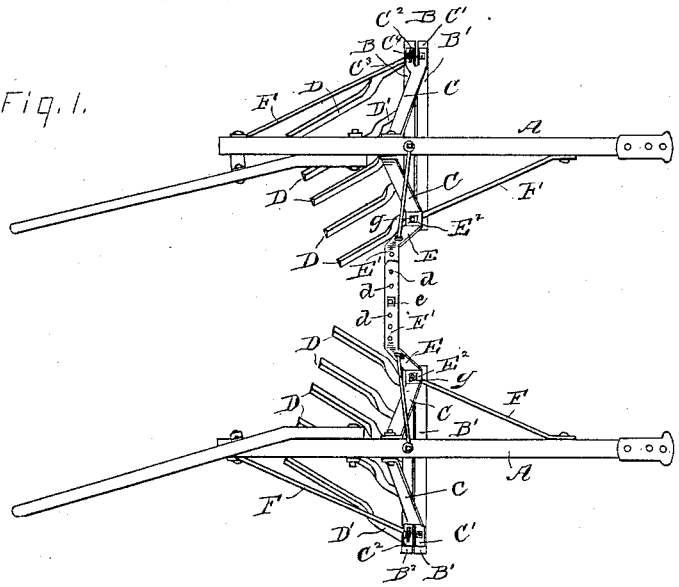
Figure 2:
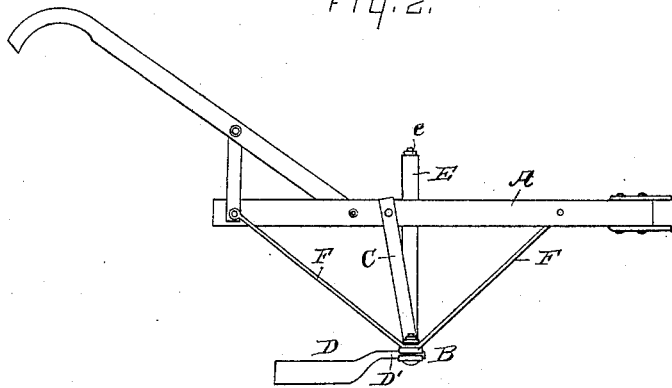

In the drawings, Figure 1 is a plan of our invention. Fig. 2 is a side elevation thereof. Fig. 3 is a partial rear elevation. Figs. 4 and 5 are details of the knife-head.

The machine consists of two counter parts, and any description of one of such parts herein given is intended to apply to both of such parts.

A A are the beams, suitably connected at their front ends to the axle of carrying-wheels. (Not shown.)

B' is the front section of the knife-head B, and B² the rear section thereof.

C C are diagonal braces extending, respectively, from each end of the knife-head upward to the beam A, and attached to the latter. The brace C has a split foot, the front part, C', of which is bolted to the front section, B', of the head B, and the rear part, C², of such foot to the rear section, B². In the part C² is formed the slot C³, and by means of a vertical bolt, C⁴, passed through such slot and the section B², the latter can be shifted laterally. The parts B' and B² are each composed of two horizontal plates, a, placed one above the other, with slight beds b, formed in each of their adjacent faces, to receive the shanks of the knives D. The shanks D' of the knives D are projected diagonally from the rear between each pair of plates a, and when the end vertical bolts which hold such plates together, are tightened are held firmly between such plates. The beds b are sufficiently wide to permit (when said bolts are loosened) of the necessary lateral adjustment of said knives. By loosening the bolts C⁴, therefore, and moving the part B² laterally, the knives D can be given any lateral position desired.

E E are braces extending from the inner end of the knife-head upward, and having their upper and horizontal ends, E', mutually crossed. These ends E' are each provided with a series of holes, d, and by means of a vertical bolt, e, held together. The ends E' can be moved on each other, and the bolt e put in any of the holes d, and thus the relative width of the knife-head adjusted. The horizontal ends E' lie contiguous the length of their lap, and are held from lateral oscillation by the bolt e. The foot E² of each brace E is horizontal and held flat upon the head B by a bolt, g. Thus the series of knives D are held in a horizontal plane, so as to have a uniform depth of cut; but the bolt g permits a horizontal pivot action of the head B, and, in connection with the pivotal connection of the forward ends of the beam A, allows great flexibility laterally to each of the heads B—a great necessity in crooked rows of corn.

The knives have a straight lower cutting-edge, and each series decreases in length toward the center of the machine, whereby each series can be set at an angle laterally with the head, without bringing the rear ends of the inner knives too close to the corn, and at the same time permit the knife-head to remain perpendicular to the row of corn.

F F are diagonal braces extending forward and back, respectively, from each end of the knife-head to the beam A.

The front end of the beams A are attached to the axle of the carrying-wheels in any of the well-known modes of securing vertical adjustment, and thus the position of the lower edge of the knives D, in reference to the earth, can be regulated as desired.

The forward connection of the beams A is pivotal laterally, permitting the lateral swinging of the heads B, so as to readily guide the latter between the rows.

What we claim as our invention, and desire to secure by Letters Patent of the United States, is—

1. The combination of the beam A, braces C, provided with split feet C' and C², the latter provided with slot C³, the knife-head B, constructed of sections B' and B², the latter adjustable in such slot, the vertical bolt C⁴, and knives D, whereby the lateral shifting of said knives is accomplished, substantially as shown, and for the purpose specified.

2. The combination of the knife-head B and a series of knives, D, seated obliquely in such head, decreasing in length from the outer to the inner of said knives, substantially as shown and described.

In testimony whereof we affix our signatures in presence of two witnesses.

ROBERT ADAMS.
MATTHEW R. ADAMS.

Witnesses:
BELLE MANAHAN,
CHATTIE L. MANAHAN.